United States Patent
Grasso et al.

(10) Patent No.: US 9,889,823 B2
(45) Date of Patent: Feb. 13, 2018

(54) HYDRAULIC CONNECTOR FOR A WINDSHIELD WIPER BLADE HAVING A RETRACTABLE BUTTON

(71) Applicant: Valeo Systèmes d'Essuyage, Le Mesnil Saint Denis (FR)

(72) Inventors: Giuseppe Grasso, Le Breuil sur Couze (FR); Florent Delfosse, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 723 days.

(21) Appl. No.: 14/160,043

(22) Filed: Jan. 21, 2014

(65) Prior Publication Data

US 2014/0196240 A1 Jul. 17, 2014

Related U.S. Application Data

(63) Continuation of application No. 13/989,894, filed as application No. PCT/EP2011/066674 on Sep. 26, 2011, now abandoned.

(30) Foreign Application Priority Data

Dec. 2, 2010 (FR) ...................... 10 04683

(51) Int. Cl.
*B60S 1/52* (2006.01)
*B60S 1/38* (2006.01)
*B60S 1/40* (2006.01)

(52) U.S. Cl.
CPC ............. *B60S 1/524* (2013.01); *B60S 1/3862* (2013.01); *B60S 1/4048* (2013.01); *B60S 2001/4054* (2013.01); *Y10T 29/49947* (2015.01)

(58) Field of Classification Search
CPC .............................. B60S 1/3862; B60S 1/524
USPC ....................................... 15/250.04
See application file for complete search history.

(56) References Cited

U.S. PATENT DOCUMENTS

2013/0263400 A1 10/2013 Duesterhoeft et al.

FOREIGN PATENT DOCUMENTS

DE 102008049269 A1 * 4/2010 .............. B60S 1/391

OTHER PUBLICATIONS

DE102008049269A1 (machine translation), 2010.*

* cited by examiner

*Primary Examiner* — Andrew A Horton
(74) *Attorney, Agent, or Firm* — Osha Liang LLP

(57) ABSTRACT

A hydraulic connector for a wiper system includes an end part of an arm extending in a longitudinal direction, a blade, a mechanical connector fixed to the blade for attaching the blade to the arm, and at least one pipe for conveying a liquid to the blade via the mechanical connector and at least one button intended to connect the hydraulic connector to the end part in a standby position. The button is retractable so as to allow movement of the hydraulic connector with respect to the end part.

13 Claims, 3 Drawing Sheets

HYDRAULIC CONNECTOR FOR A WINDSHIELD WIPER BLADE HAVING A RETRACTABLE BUTTON

The field of the present invention is that of vehicle equipment, and more particularly, that of equipment for wiping the windows of motor vehicles.

Motor vehicles are commonly fitted with wiper systems for wiping the windshield and preventing the view that the driver has of his surroundings from being disturbed. These wipers are conventionally driven by a wiper arm moving angularly back and forth and comprise elongate blades, which themselves carry wiper blade rubbers made of an elastic material. These blade rubbers rub against the windshield and remove the water by conducting it away from the field of view of the driver. The blades are produced either, in a conventional version, in the form of articulated frames or superstructures which hold the wiper blade rubber at a number of discrete points or, in a more recent development known as "flat blade" wipers, in the form of a semirigid assembly which holds the wiper blade rubber along its entire length. In this second solution, the blade is attached to the rotary arm of the wiper by an assembly consisting of a mechanical connector and of an adaptor. The mechanical connector is a component crimped directly onto the flat blade, while the adaptor is an intermediate component that allows the connector to be attached to the wiper arm. These two components are joined together by a transverse pin which allows relative rotation thereof, in a plane perpendicular to the windshield and passing through the arm.

Wipers are also fitted with devices for conveying a washer fluid which is conveyed from a reservoir situated on the vehicle and sprayed toward the windshield by nozzles situated either around the windshield or on the wiper itself for a better distribution of the fluid. In the case of nozzles positioned on the blades, the washer fluid is, before being distributed amongst themselves, conveyed by pipes which are fixed to the wiper blade holder and are connected to the blade distribution system at the mechanical connector by a rigid component referred to as a hydraulic connector. These pipes, which are generally flexible and of which there are two in order to clean both on the outward stroke and on the return stroke of the blade, open into the hydraulic connector, which is fixed to the mechanical connector by suitable end fittings which provide the necessary seal therewith. The mechanical connector thus comprises orifices which, via a sealed connection, are able to accept said end fittings of the hydraulic connector.

In models for top-of-the-range vehicles, there are also devices for heating the wiper in order to defrost the blade if the weather is very cold and to prevent it from sticking to the windshield as a result of icing. These devices, which are more specially suited to flat blades, generally comprise a heating device incorporated into the assembly bearing the wiper blade and to which electrically resistive elements are applied. These too require an electrical connection device able to collaborate with the mechanical connector in order to transmit electrical current from the vehicle to the heating device. The electrical connector is generally attached to the hydraulic connector before the latter is mounted on the mechanical connector so that it can be fitted at the same time thereas. Quick connection devices therefore provide the contact between the connections of the electric connector and those of the mechanical connector and, ultimately, contact with the resistive heating elements of the assembly bearing the wiper blade.

Document WO2010/034445 discloses one embodiment of a mechanical connector which accepts a hydraulic connector through which washer fluid passes. It also discloses an electrical connector which supplies the mechanical connector with electricity.

Whereas the fluid pipes and the hydraulic connector are generally connected to the wiper blade holder, the mechanical connector is connected to the blade and the hydraulic connector and, therefore, the electric connector, have to be connected up to the mechanical connector whenever the wiper blades are changed.

During this operation, it is necessary to take care to ensure that the hydraulic and electrical connectors are correctly aligned when they are being installed in the mechanical connector, because if they are not, poor assembly will result in a risk of washer fluid leaking from the joint between the two connectors and/or in poor electrical contact. Now, this operation is performed blind, because the hydraulic connector is situated under the upper part of the blade holder, preventing a good view of the components that have to be assembled. Document WO2010/034445 does not allow the hydraulic connector to be aligned with respect to the mechanical connector because the hydraulic connector is mounted on the blade in an isostatic manner thus preventing any relative movement of one relative to the other.

Further, when the blade is being uncoupled or removed from the blade holder, it is important for the hydraulic connector and, therefore, the electric connector if attached to it, to remain attached to the blade holder. That prevents the hydraulic connector from being carried along by the mechanical connector in the movement of it separating from the wiper blade holder. Moreover, it is not acceptable to leave the hydraulic connector dangling under the end part of the wiper arm when the blade has been removed.

Finally, upon refitting, it is inconceivable to expect the operator to keep the hydraulic connector in position with one of his hands while at the same time expecting him to refit the blade on the arm using the other hand. Such a situation makes fitting the blade particularly difficult and unergonomic because fitting the blade to the arm is an operation which on its own already requires the use of both hands, one hand being devoted to the blade and the other to the wiper arm.

It is therefore important to make the insertion and removal of the hydraulic connector of the mechanical connector easier and to contrive for connection and disconnection to be performed correctly, even in the hands of an inexperienced operator. The same is true of the electrical continuity to be ensured between the connections of the electrical connector and those of the mechanical connector.

It is an object of the present invention to address these disadvantages by proposing a device that allows the hydraulic connector to be guided as it is inserted into the mechanical connector and that holds it in position on the arm when the latter is being removed. This guidance function can also guide the electrical connector when the electrical connector has already been fitted to the hydraulic connector.

To this end, one subject of the invention is a hydraulic connector for a wiper system, said wiper system comprising an end part of an arm extending in a longitudinal direction, a blade and a mechanical connector fixed to said blade for attaching it to the arm, said hydraulic connector comprising at least one pipe for conveying a liquid to the blade via the mechanical connector and at least one first blocking means intended to connect the hydraulic connector to the end part in a standby position, characterized in that said first blocking means is retractable so as to allow movement of the hydraulic connector with respect to the end part.

Retractable here means that the blocking means is flexible under the action of the user and that it has a memory effect, i.e. capable of reverting to its initial position when not subjected to an action.

The blocking means allows the hydraulic connector to be held against the internal face of the end part and held longitudinally, thus allowing pressure to be applied to it in a chosen direction in order to attach it to the mechanical connector, without the operator needing to intervene in aligning the two connectors during this operation.

According to a first feature, the first blocking means is able to block a translational movement between the hydraulic connector and the end part, said first blocking means being able, in the standby position, to collaborate with a second blocking means borne by said end part to allow its attachment to the mechanical connector in a first part of the translational movement thereof, said first blocking means being retractable in a direction perpendicular to said translational movement so as to allow the hydraulic connector to be freed from its standby position and move in conjunction with said mechanical connector in a second part of its translational movement in order to move into the position of use.

According to a second feature, the first blocking means is a flexible tab bearing a button at its end and extending along one face of said connector, said face being oriented in said longitudinal direction.

According to another feature, the pipes are connected by a block having at least one external surface with generatrices directed parallel to the direction of said translational movement and which surface is intended to collaborate with a base of the end part, notably an internal face of this base.

A structure such as this makes it possible, in the standby position, to ensure that the hydraulic connector is positioned angularly in a plane that passes through the longitudinal direction and is perpendicular to the plane swept by the arm during wiping. This configuration, which keeps the hydraulic connector and its pipes in a given alignment with respect to the end part allows the mechanical connector to be pushed in a predetermined corresponding direction, making it possible to ensure that it is aligned with the other components.

According to yet another feature, the external surface is planar, advantageously parallel to the plane swept by the arm during wiping.

According to a first feature, the connector comprises a first support means extending longitudinally and able to collaborate with a second support means positioned on said end part, so as to keep the external surface of said hydraulic connector pressed against the base of the end part.

In such an instance, the first support means is a finger and the second support means is a rail borne by said end part and extending longitudinally.

Advantageously, the connector according to the invention comprises an edge face able to collaborate with a ridge borne by said end part to form an end stop for said hydraulic connector with respect to said end part. This configuration has the advantage of a suitable positioning of the first blocking means so that when the operator has to extract it from the second blocking means the hydraulic connector is already in a position of attachment to the mechanical connector.

Advantageously also, the hydraulic connector comprises a protrusion able to be forced into a recess borne by or moulded as an integral part of the mechanical connector. Such penetration creates a hard point that gives the operator information as to whether the hydraulic connector has actually been attached to or detached from the mechanical connector.

In this situation, the protrusion is a cylindrical or circular journal extending laterally with respect to the hydraulic connector, namely on the side thereof.

The invention also covers a device for connecting a wiper system comprising an end part positioned at the end of an arm extending in a longitudinal direction, a blade, a mechanical connector fixed to said blade for its attachment to the arm via an adaptor interposed between the end part and the mechanical connector, characterized in that it comprises a hydraulic connector according to one of the features mentioned hereinabove.

In such a device, the end part comprises at least one second support means extending in the longitudinal direction and a first end of which forms an end stop for a corresponding end stop positioned on the adaptor in a position of use and the other end of which forms an end stop for an edge face made on the hydraulic connector in a standby position.

The second support means is formed of a rail extending in the longitudinal direction and on which the hydraulic connector, and advantageously the mechanical connector, slides during the movement from the standby position to the position of use, or vice versa.

Advantageously, the hydraulic connector comprises an external surface, the end part comprises a base and a second support means, notably at least one rail, extending parallel to the base and distant therefrom by a length such that it keeps the external surface pressed against the base during a translational movement between the hydraulic connector and the end part.

Advantageously also, the adaptor comprises a fifth blocking means for its attachment to the end part able to collaborate with the second blocking means in the position of use, said first blocking means being retracted in this position.

The invention further relates to a method of assembling the connection device which, starting from a standby position in which the hydraulic connector is attached to the end part and held longitudinally in position with respect to it by the collaboration at least of the first blocking means with the second blocking means, involves the following steps:

alignment on the end part of the mechanical connector equipped with an adaptor bearing a fifth blocking means, longitudinal pressing of said mechanical connector into an internal volume of the end part until the mechanical connector comes into abutment against the hydraulic connector, possibly followed by the overcoming of a hard point in the securing-together of the two connectors, retraction of the first blocking means to free it from the second blocking means, continued longitudinal pressing on the mechanical connector, associated with the hydraulic connector, until the fifth blocking means collaborates with a corresponding blocking means positioned on the end part.

The invention will be better understood, and other objects, details, features and advantages thereof will become more clearly apparent during the course of the detailed explanatory description which will follow, of a number of embodiments of the invention which are given by way of purely illustrative and nonlimiting examples with reference to the attached schematic drawings.

Figure 4:
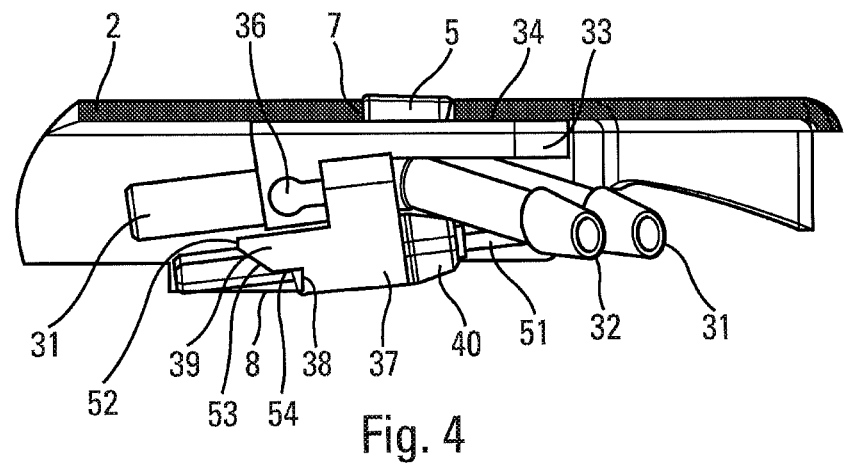
Figure 5:
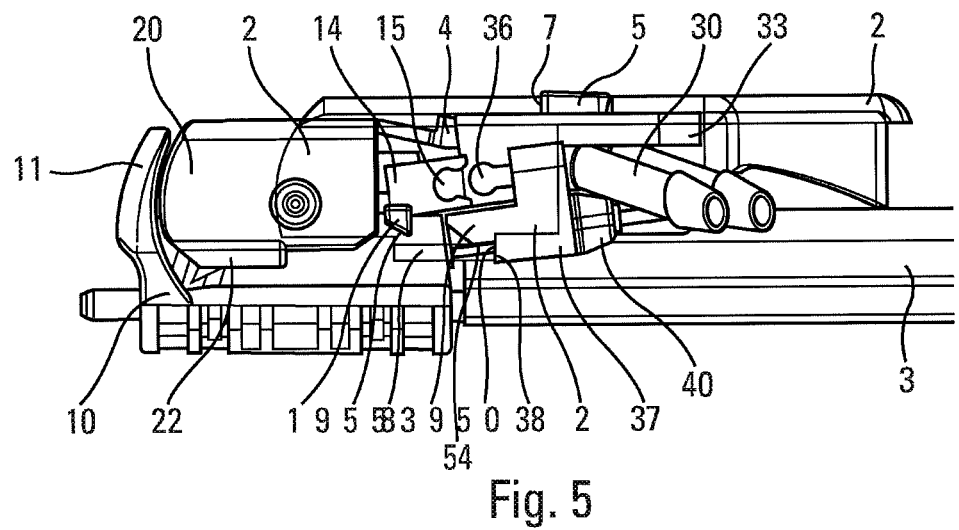
Figure 6:
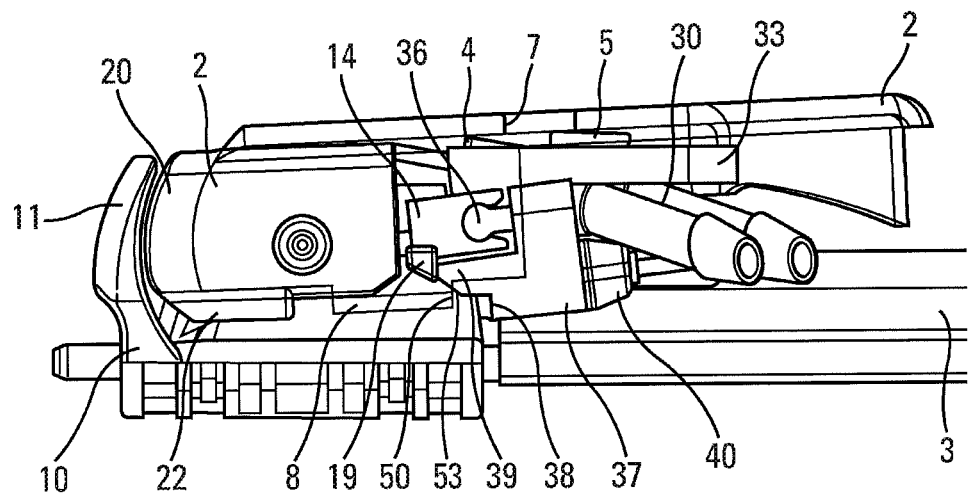
Figure 7:
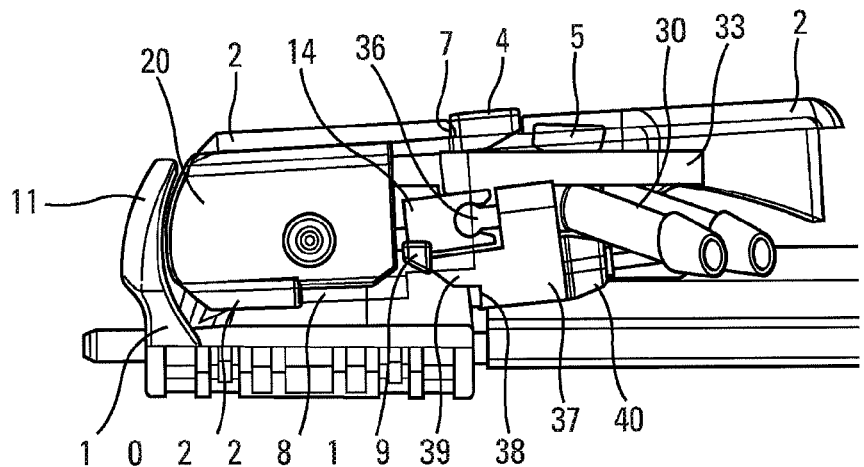
Figure 8:
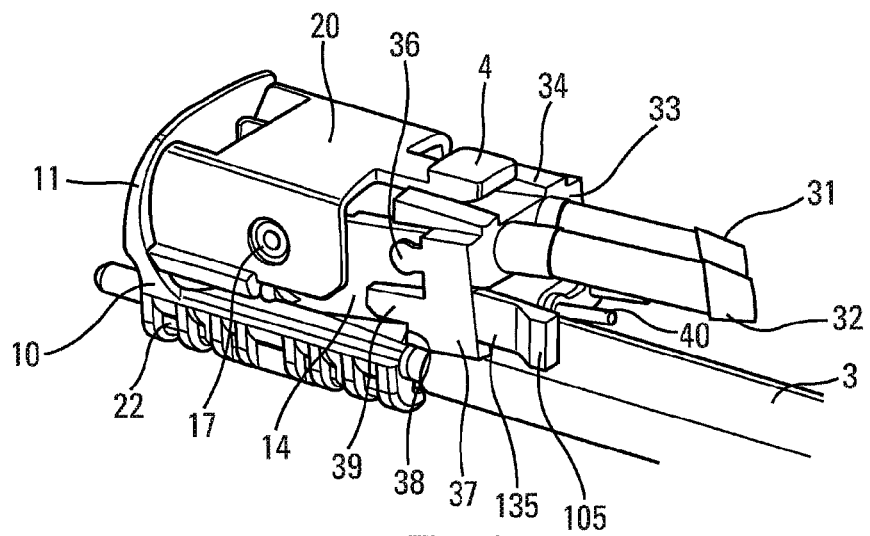
Figure 9:
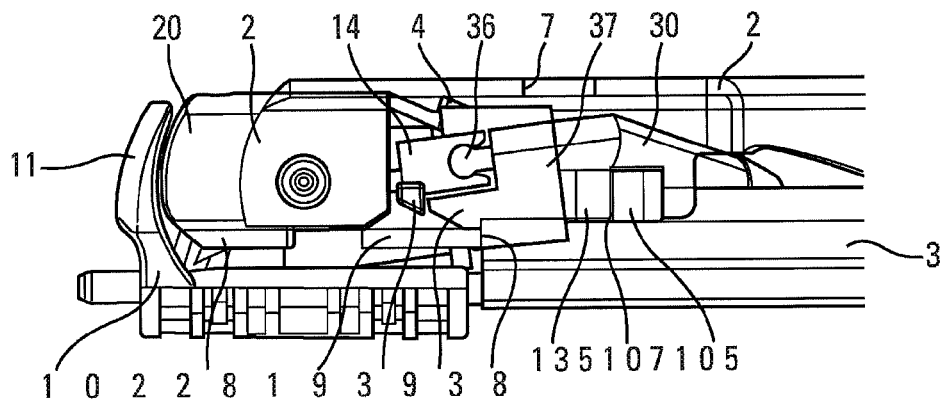

FIG. 4 is a face-on view of a hydraulic connector according to the first embodiment of the invention, in position in a wiper arm standing by awaiting the fitting of a blade, FIG. 5 is a face-on view of the hydraulic connector of FIG. 4 in the standby position on the arm, a mechanical connector according to the invention being offered up by introduction to the wiper arm, FIG. 6 is a face-on view of the hydraulic and mechanical connectors of FIG. 5, in an intermediate position in the fitting of the blade, FIG. 7 is a face-on-view of the hydraulic and mechanical connectors of FIG. 5, at the end of fitting, the wiper then being in the position of use, FIG. 8 is a perspective view of a hydraulic connector according to a second embodiment, fitted to a mechanical connector according to the invention, and FIG. 9 is a face-on view of the hydraulic and mechanical connectors of FIG. 8.

It should be noted that the figures explain the invention in detail and that they may, of course, serve to define the invention better, if need be.

In the remainder of the description, the denominations longitudinal or lateral refer to the orientation of the arm on which the wiper blade is mounted. The longitudinal direction corresponds to the main axis of the arm in which it extends while the lateral orientations correspond to concurrent straight lines, i.e. lines which intersect the longitudinal direction, notably which are perpendicular to the longitudinal axis of the arm in its plane of rotation. In the case of the longitudinal directions, denominations outer or inner are to be interpreted in relation to the point of attachment of the blade to the arm, the denomination inner corresponding to the part in which the arm and half a blade extend. Finally, directions referred to as upper or lower correspond to orientations which are perpendicular to the plane of rotation of the arm, the denomination lower containing the plane of the windshield.

Figure 1:
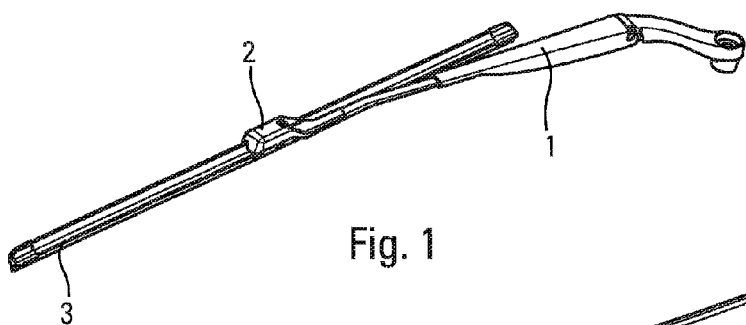
FIG. 1 is a perspective overview of a wiper system for wiping the windows of a motor vehicle.
Figure 2:
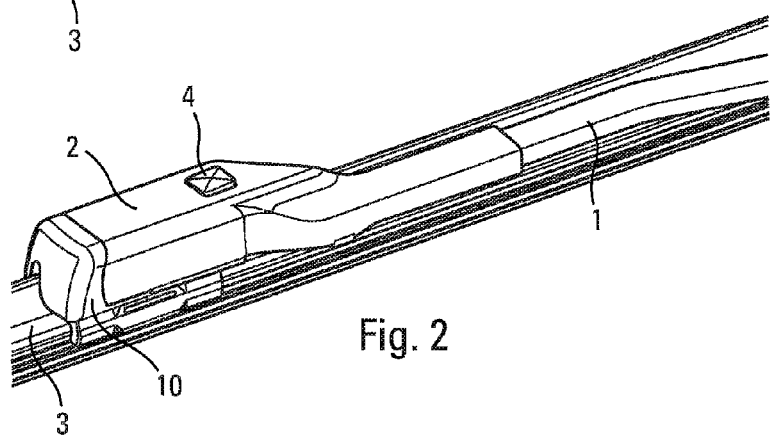
FIG. 2 is a detailed view of FIG. 1, showing the connection between the arm and the blade of the wiper system.

Reference is made to FIGS. 1 and 2 which shows a wiper made up of a wiper holder or arm 1 extending at its outer end by an end part 2. The end part 2 may be produced as one piece with the arm 1 or may be formed of an end piece which is attached, on the inner side, by crimping to the arm 1. The end part 2 covers an adaptor bearing the blade 3 via its mechanical connector 10. The purpose of the adaptor is to be inserted into the end part 2 in a translational movement along a longitudinal axis, in order to arrive at the position of use in which it is in abutment against a collaborating shape imparted to the end part 2. There it is reversibly attached by means of a first retractable locking button 4 which is fixed at the end of a first flexible tab extending from the adaptor and collaborating with a recess made for that purpose in the upper part of the end part 2.

Figure 3:
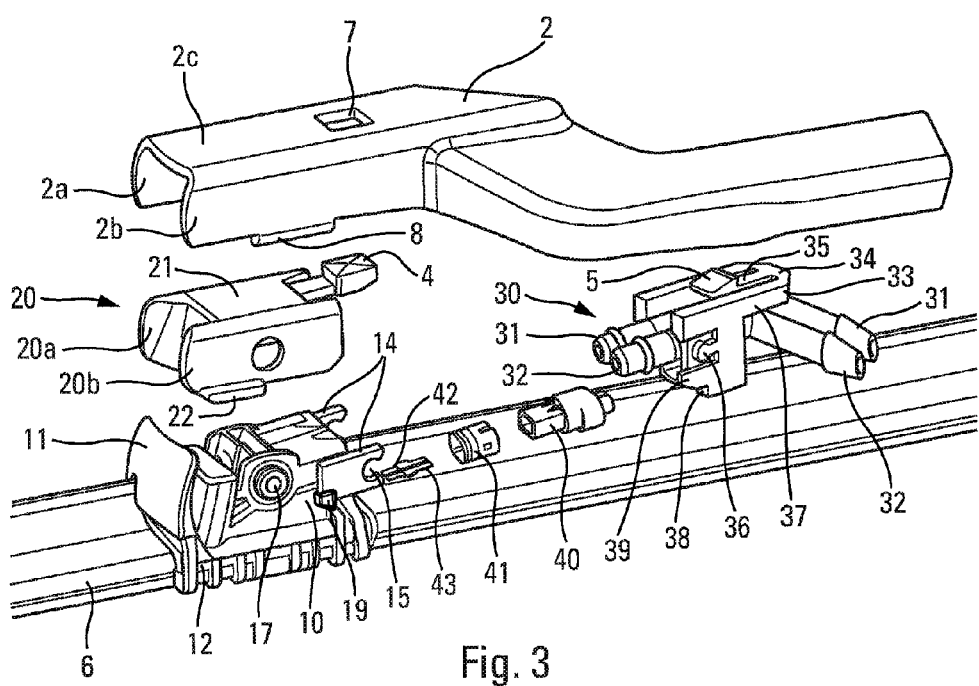
FIG. 3 is an exploded view of the connection of FIG. 2 comprising an arm and a hydraulic connector according to the first embodiment of the invention.

Reference is now made to FIG. 3 which shows in detail elements which are used for attaching the blade 3 to the arm 1, the hydraulic connector 30 being shown in the first embodiment.

The end part 2 is in the shape of an inverted U in which the opening of this U-shape faces the windshield. This end part 2 comprises a base 2c at the upper part and two lateral branches 2a and 2b extending toward the glass. A cutout 7 is made in the base 2c and can house either the first retractable locking button 4 of the adaptor 20, when the arm 1 is in the position of use, or a second retractable button 5 borne by the hydraulic connector, when the arm 1 is in a standby position, which means when the arm is fitted with a hydraulic connector 30 but does not bear a blade 3. The lower edge face of each lateral branch comprises a second support means which adopts the form of a rail 8 bent at 90° toward the internal volume and defined by the base 2c and the lateral branches 2a and 2b and the function of which is, firstly, to guide longitudinally the insertion of the adaptor 20 into the end part 2 and secondly, to act as a translational end stop, in one direction, for corresponding end stops each formed by a lip 22 placed on the adaptor 20 and in the other direction for corresponding edge faces 38 placed on the hydraulic connector 30. The rail 8 also defines one dimension of the internal volume of the end part 2 which guarantees that a hydraulic connector 30 can be lodged therein while still being able to slide.

The adaptor 20 is in the shape a yoke, complementing the internal volume of the end part 2, so that it can be lodged therein. Two lateral walls 20a and 20b are connected by a bridge 21. At least one of these walls, and advantageously each wall, comprises at its free end the lip 22 which is bent over toward the outside of the adaptor. These lips 22 form an end stop for translational movement when they come against the rails of the lateral branches of the end part 2. This adaptor 20 also comprises two holes made through its lateral walls 20a and 20b and having a coincident axis, intended to serve as the axis of rotation between the blade 3 and the arm 1 when the wiper system incorporating the hydraulic connector is assembled. This is because the blade needs to have at least one degree of freedom to rotate with respect to the arm 1, and more specifically with respect to the end part 2, so as to allow the blade 3 to follow the curvature of the glass that is to be wiped, during the back and forth movement of the arm across this glass.

The mechanical connector 10 is secured without possibility of detachment to the blade 3 so as to ensure that mechanical load from the arm 1 is transmitted to the blade 3. It has a substantially parallelepipedal shape extending along the axis of the blade, with two lateral flanks from which two first journals 17 extend laterally, the function of these journals being firstly to secure the mechanical connector to the adaptor 20 and secondly, by collaborating with the holes made in the lateral walls 20a and 20b of the adaptor, to act as pivots for the rotation of the blade 3 with respect to the arm 1.

On the outer side, the mechanical connector 10 has a wall 11 termed a cap which, first of all, closes off the front part of the end part 2 and acts as a screen to protect the components contained within this end part 2 and, secondly, provides a good-quality exterior finish. The opposite face to the cap 11, referred to as the inner face, comprises orifices (not visible) for hydraulic and electrical connection to the corresponding elements of the hydraulic connector 30 and of the electrical connector 40.

This inner face of the mechanical connector 10 comprises two hydraulic inlet orifices extended by internal ducts for the distribution of the washer fluid, which are intended to collaborate with the pipes 31 and 32 of the hydraulic connector 30 which supply it with fluid. These distribution ducts (which are not depicted in the figures) extend inside the mechanical connector 10 to open in line with feed ducts 12 that feed the liquid spray tubes 6 with which the blade is equipped. As indicated previously, these tubes 6 extend along the two edges of the blade 3 so as to spray washer fluid during the outward and return strokes of the blade in its sweeping movement.

The inner face of the mechanical connector also comprises orifices containing male connections 42 and 43 onto which female terminals borne by the mechanical connector 10 can fit. This electrical connection provides the electrical power needed for the operation of the heating element incorporated into the blade.

The lateral faces of the mechanical connector 10 extend in the direction of the hydraulic connector, namely on the same side as its interior face, in the form of two flat plates 14 forming rigid tabs the inner end of which is cut to form a keyhole-shaped recess 15. This recess has an open circular shape extended longitudinally, widening as it does so, by a V-shape. These two parts of the recess 15 meet at a restricted neck the purpose of which is to create a hard point when second journals 36 borne by the hydraulic connector are inserted into or removed from the cylindrical part of this recess 15 when the hydraulic connector is being attached or separated. The recess 15 and its hard point therefore prevent inadvertent separation of these second journals, so as to ensure that the hydraulic connector is secured firmly to the mechanical connector in the position of use.

On the lower corner and on the outer side, each tab 14 bears a protrusion forming an end stop 19 which has a transverse face extending vertically to collaborate with a corresponding end stop positioned at the end of a first support means 39 of the hydraulic connector 30.

The hydraulic connector 30 takes the form of two pipes 31 and 32 of cylindrical cross section, positioned in parallel longitudinally and embedded in a securing block 33. These pipes 31 and 32 each comprise two contiguous parts which extend in directions oriented at an angle to one another, the junction between these parts forming an elbow situated within the block 33. Such a structure allows the shape of the pipes 31 and 32 and of the block 33 to be tailored to suit the shape of the end part 2 under which they are positioned. On the inner side, each pipe 31 or 32 comprises a coupling with a step or a shoulder onto which flexible washer fluid supply hoses which run along the arm 1 from the liquid reservoir can be push-fitted. On the outer side, each of the pipes 31 and 32 has a cylindrical shape that can be inserted into the orifice of one of the internal distribution ducts of the mechanical connector 10. O-ring seals are positioned near this outer end to provide sealing between the pipes 31 and 32 and the orifices of the distribution ducts into which they penetrate.

The block 33 is a substantially parallelepipedal shape with its longest length oriented longitudinally and which extends mainly above the two pipes 31 and 32. The upper part, which forms a roof or an external surface 34 of the block 33 is planar so as to collaborate with the inner part, which is likewise planar, of the base 2c of the end part 2 of the arm 1. This base acts as a seating for the hydraulic connector in the vertical direction, via its external surface 34, and acts so as to guide the longitudinal movements of this connector when the blade 3 is being installed on or removed from the arm 1.

As can be seen better in FIG. 4, the direction of the pipes 31 and 32 is not parallel to the external surface 34 but angled downward corresponding to the direction in which the liquid distribution ducts, into which these pipes fit, extend. Likewise, the relative distance between the pipes 31 and 32 and the external surface 34 is such that the tip of these pipes is level with the point at which the mechanical connector 10 enters the distribution ducts when the external surface 34 is in contact with the internal face of the base 2c and when the mechanical connector 10 and the adaptor 20 are in position on the end part 2 to be incorporated thereinto.

This geometric configuration imparted to the external surface 34 and to the pipes 31 and 32 generates automatic alignment of these pipes with the ducts of the mechanical connector 10, without any direct operator intervention being required, this forming one of the objectives pursued by the invention.

The central part of the external surface 34 is cut longitudinally to reveal a second flexible tab 35, able to move in a vertical plane and which is attached by its inner end to the block 33. At its outer end it bears the second retractable button 5 the purpose of which is to fit, in the standby position, into the cutout 7 of the end part 2 of the arm 1. A hollow parallelepipedal volume is provided in the upper part of the block 33 to allow the second tab 35 to move aside under the external surface 34 when the second button 5 is not projecting into the cutout 7.

The lateral walls 37 of the block 33 are oriented vertically and separated from one another by a length corresponding substantially to the internal separation there is between the lateral branches 2a and 2b of the end part 2, so that the block 33 is guided by these branches in its longitudinal movements when the blade 3 is being installed on or removed from the arm 1. The lateral walls 37 each bear a second journal 36 extending laterally so that it projects to face one of the recesses 15 of the mechanical connector and be able to fit thereinto when the hydraulic connector 30 is secured to the mechanical connector 10. As depicted in the figures, the second journals 36 are extended, on the inner side, by a ridge running longitudinally, although this configuration is not essential.

Finally, at its lower part, the lateral walls 37 have, on the outer side, two vertical faces or edge faces 38, oriented transversely and which form end stops to collaborate with a ridge 50 of the end part 2, for example formed at the inner end of the rail 8 of this end part 2. These outer edge faces 38, while retaining the hydraulic connector, allow it to be separated from the mechanical connector when the mechanical connector is pulled off for a blade change. Above this outer edge face 38 and at least on one side of the hydraulic connector 30 or, advantageously, on both sides, extends in the longitudinal direction the first support means 39 which adopts the form of a finger. This support means has a lower part which forms a seating surface to allow this hydraulic connector to be supported by the rail 8 of the end part 2, in the standby position also known as the service position, and to allow it to slide along this rail during the relative longitudinal movements of the hydraulic connector and of the end part.

The finger 39 also comprises, on the outer side, a vertical face acting as an end stop to collaborate with the end stop 19 positioned on the mechanical connector 10. Collaboration between these two end stops 19 and 39 makes it possible, from the moment that they come into contact with one another, for the thrust applied to the mechanical connector to be transmitted to the hydraulic connector when a new blade 3 is being fitted. This transmission of thrust complements the thrust applied by the second journal 36 housed in the tab 14. Aside from the fact that this thrust allows the hydraulic connector to be moved longitudinally by the mechanical connector, it causes the hydraulic connector 30 to become detached from the end part 2 by making the finger 39 retreat and leave the rail 8. The set of two connectors is therefore free to rotate with respect to the arm 1, thus allowing the blade 3 to follow the curvature of the glass that is to be wiped.

On its lower face, the hydraulic connector 30 comprises attachment means intended to collaborate with corresponding support means placed on the electrical connector 40, in the configuration of which the electrical connector is borne by the hydraulic connector and fixed to it before the assembly is attached to the mechanical connector 10. Means that block the electrical connector 40 in terms of longitudinal translation on the hydraulic connector 30 may also be used to prevent the electrical connector from being withdrawn after it has been fitted. Quite clearly, any means of attachment of the electrical connector 40 to the hydraulic connector 30, or even an absence of attachment, attachment then being directly onto the mechanical connector, may be conceived of without departing from the scope of the invention.

As depicted in FIG. 3, the electrical connector 40 comprises a body which can be inserted into the attachment means borne by the hydraulic connector 30. It also accepts a sealing device 41 slipped onto the body, which seals the electrical connection between the electrical connector and the mechanical connector. The body is longitudinally pierced with two hollow tubes in which metallic connectors are positioned to provide the electrical connection between power supply leads (visible in FIG. 4, reference 51) leading from the cabin via the arm 1 and male connections 42 and 43 installed in the mechanical connector and which provide electrical connection to the electrical circuit which passes through the mechanical connector 10 to reach the resistive elements that heat the wiper blade.

Reference is now made to FIG. 4 which shows a hydraulic connector 30 according to the first embodiment of the invention, in place in the end part 2 of an arm 1, this arm being in the standby position, awaiting the introduction of the mechanical connector 10 of a blade 3. The end part 2 is shown in cross section on a plane oriented longitudinally and perpendicular to the plane of rotation of the arm. The external surface 34 is in position against the internal face of the base 2c of the end part 2 and the second locking button 5 is housed in the cutout 7 of this end part, this positioning the pipes 31 and 32 in an orientation compatible with their introduction into the washer fluid distribution ducts.

The first support means 39 is formed by a protrusion that forms a finger protruding from the lateral face 37 of the hydraulic connector 30. This first support means 39 has a free end or vertical face 51 the purpose of which is to act as an end stop. This first support means 39 also comprises a ramp 53 formed by a chamfered edge face of the finger 39. This ramp 53 provides the transition in the movement from the standby or service position to the position of use. A lower part of the finger 39, referenced 54, interposed between the ramp 53 and the outer edge face 38, is designed to come into contact with the rail 8 of the end part 2, making it possible to determine the angle of inclination there is between the standby position and the position of use of the wiper blade.

The hydraulic connector is pushed forward as far as it will go toward the outer side, which means that the second retractable button 5 is positioned in the cutout and that the outer edge face or faces 38 of the lateral faces 37 are in contact with the ridge or ridges 50 formed by the inner end of the rails 8 of the end part 2. The presence of the second flexible tab 35, which causes the second button 5 to enter the cutout 7 as soon as it comes opposite that cutout, prevents the hydraulic connector from moving back with respect to the end part 2 when it has not been secured to the mechanical connector. It is thus held above the rail 8, and therefore supported by it, preventing the hydraulic connector from remaining unsupported in the standby position. The presence of the rail 8 and the distance separating it from the internal face of the base 2c also guarantees that, under the effect of the flexing of the second tab 35, the second button 5 will completely enter the cutout, at least so that the edge of the second button rests against the peripheral edge face of the cutout.

In this standby position, the hydraulic connector 30 is perfectly held, in terms of longitudinal position by the second retractable button 5, in terms of vertical position by the rail 8, and in terms of rotation by the collaboration of the external surface 34 with the internal face of the base 2c of the end part 2. The positioning and orientation of the pipes 31 and 32 are therefore perfectly defined with respect to the end part and these pipes are therefore, by construction, correctly aligned with the washer fluid distribution ducts when the mechanical connector 10 is in position for insertion into this end part 2.

FIGS. 5 to 7 depict the end part 2 showing hidden detail to reveal the hydraulic connector situated inside, and show the collaboration there is between the end stops of the two components.

FIG. 5 shows the assembly made up, firstly, of the hydraulic connector 30 mounted on the end part 2 and, secondly, of a mechanical connector 10 equipped with its adaptor 20.

In the position depicted, the hydraulic connector is still in the position illustrated in FIG. 4, whereas the mechanical connector is pre-positioned to be fitted into this end part through a translational movement in the longitudinal direction which extends along the length of the arm 1.

As indicated previously, the hydraulic connector 30 at its upper part is in contact via its external surface 34 with the internal face of the base 2c and rests, at its lower part, on the rail 8 via the lower part 54 of its finger 39. It is blocked in terms of rearward translational movement by the collaboration of the second retractable button 5 with the cutout 7. The lateral wall 37 rests, via its outer edge face 38, against the end part 2 and, in particular, against the ridge 50 formed at the end of the rail 8.

On the side of the mechanical connector 10, the latter is aligned longitudinally with the end part 2 so that the lateral walls 20a and 20b of the adaptor begin to engage on the rails 8 of the end part. In order to reach this position, the first flexible tab, which bears the first retractable button 4, has been deflected downward, so as to slip under the base 2c of the end part 2.

Formed immediately adjacent to the transverse face of the end stop 19 is an oblique surface 55 which extends in an angular plane other than zero with respect to the transverse face of the end stop 19. This oblique surface 19 therefore forms a secondary ramp which extends the ramp 53 formed on the finger 39. The plane of this oblique surface 55 and the plane in which the ramp 53 extends coincide and the purpose of this oblique surface is to continue the ramp 53 to perfect the transition between the standby position and the position of use.

In FIG. 6, the mechanical connector 10 has been partially pushed into the end part 2. It is now secured to the hydraulic connector 30 which has begun to move back with respect to the end part 2. To allow this backward retreat, the second flexible tab 35 has been deflected downward and the second retractable button 5 has been pushed out of the cutout 7; it is then held, with sliding pressure, under the internal face of the base 2c of the end part 2 and pressed firmly against this by the force applied by the rail 8 pressing against the ramp 53 of the hydraulic connector 30. The second journal 36 has passed beyond the hard point of the tab 14 and has entered the recess 15 of the latter. In this position, the hydraulic connector 30 is now supported only by the mechanical connector to which it is attached by collaboration between the second journal 36 and the recess 15 of the tab 14 and by the collaboration between the transverse faces thereof. It is thus no longer connected to the end part 2, the second button 5 having left the cutout 7 and the finger 39 resting on the rail 8 only via the ramp 53 thereof. There is therefore a gap between the outer edge face 38 and the ridge 50.

FIG. 7 shows the wiper in the position of use. By comparison with the preceding figure, the mechanical connector 10, with the adaptor 20 connected to it, integrated or translated in full into the end part 2. The adaptor 20 is coming to abutment against the end part 2, the lips thereof 22 collaborating against the rails 8 of the two lateral walls 20a and 20b.

In this position, the first flexible tab is in a longitudinal position such that the first retractable button 4 faces the cutout 7 in which it is integrated and thereby secures the blade 3 to the arm 1. The hydraulic connector remains, as before, supported only by the mechanical connector. The gap there is between the outer edge face 38 and the ridge 50, or transverse face of the rail 8, is at its maximum amplitude. The inner face of the rail 8 is therefore no longer situated under the finger 39, and this now allows the combination of the two connectors to be rotated about the axis embodied by the first journals 17 and, as a result, allows the blade 3 to follow the curvature of the glass that is to be wiped.

A second embodiment of the invention will now be described with reference to FIGS. 8 and 9. Elements which are identical in the two embodiments are denoted by the same reference numeral and are not described again. In FIG. 9, the end part 2 has been depicted showing hidden detail in order to reveal elements that lie within its volume.

Unlike in the first embodiment, the block 33 bears no second flexible tab 35 on its external surface 34, although this surface nonetheless still has a cutout, at least as far as its upper part is concerned, to leave space so that the first flexible tab of the adaptor 20 can move therein. By contrast, at least one and, advantageously, two, second flexible tabs 135, extending longitudinally toward the inner side and ending in second retractable buttons 105, are positioned on its lateral walls 37. The second retractable buttons 105 have the shape of a tooth which projects with respect to these lateral walls.

At the same time, the end part 2 comprises two cutouts 107 positioned on its lateral faces 2a and/or 2b such that the second retractable buttons 105 are inserted into them when the hydraulic connector is in the standby position. For that, the tooth has, on the outer side, a beveled shape which causes the tooth to move aside so that it can enter the recess 107 under the action of thrust applied to the hydraulic connector and, on the inner side, a shape in a transverse plane that secures it to this connector.

A description will now be given of how a blade 3 is replaced on a wiper arm 1 comprising a hydraulic connector 30 according to the first embodiment of the invention, involving the removal of the used blade and its replacement with a new blade. The removal and refitting of an arm comprising a hydraulic connector according to the second embodiment are performed in a similar way, the actions applied to the second retractable button 5 being replaced by the same actions applied to a second retractable button 105 or, at the same time, to the second retractable buttons 105 when the hydraulic connector is provided with same.

To start off with, the wiper is in a position of use like that illustrated in FIG. 7. The operator begins by pressing on the first retractable button 4 to cause it, thanks to the flexibility of the first flexible tab, to move under the internal face of the base 2c. At the same time, he pulls on the mechanical connector 10, oriented longitudinally toward the outer side, to extract it from the end part 2. The adaptor 20 slides along the rails 8 and carries with it the mechanical connector 10 which pulls the hydraulic connector 30 which is connected to it through the collaboration of the protrusion 36 with the recess 15.

The external surface 34 of the hydraulic connector 30 at the same time slides against the internal face of the base 2 and this movement continues until the outer edge face 38 of the hydraulic connector 30 comes against the ridge 50 of the rail 8.

In this position, the second retractable button 5 finds itself facing the cutout 7, which it enters under the spring action applied by the second flexible tab 35. The hydraulic connector has now been secured to the end part 2, its finger 39 resting on the rail 8 and any additional translational movement being blocked by the collaboration between the second retractable button 5 and the cutout 7.

With the operator continuing to pull longitudinally on the mechanical connector 10, the force applied by the rail 8 to the outer edge face 38 holds back the hydraulic connector and causes the second journal 36 to leave the recess 15 that it had entered. This exiting of the recess is accompanied by the passage of the second journal through the restriction of the rigid tab 14 and generates the feeling of a hard point for the operator who thus knows that the two components have become uncoupled. Continued longitudinal pulling results in the adaptor 20 sliding along the rails 8 until it leaves the volume internal to the end part 2, the hydraulic connector 30 remaining attached to this end part as illustrated in FIG. 4. The used blade is then removed and free of any contact with the wiper.

A new blade is fitted in place of the worn one in a similar way, with the mechanical connector 10 first of all being aligned on the end part 2 and introduced, with the adaptor 20, into the internal volume thereof. To do that, the operator needs to press on the first flexible tab, so as to cause the first retractable button 4 to move under the base 2c and generate a spring action pushing the retractable button 4 against the internal face of this base 2c. He ensures that the lateral walls 20a and 20b of the adaptor are placed on the rails 8 and pushes the mechanical connector until he feels resistance to the translational movement. He forces against this resistance in order to pass the hard point generated by the restriction of the rigid tab 14 and thus causes the second journal 36 to enter the recess 15 of this tab.

In this position, the pipes 31 and 32 are inserted in the orifices of the internal washer fluid distribution ducts of the mechanical connector and the outer edge faces 38 of the hydraulic connector 30 are still resting against the ridges 50 of each rail 8; the overcoming of the hard point lets the operator know that these pipes have indeed been pushed fully in and that sealing between the pipes and the ducts is assured.

In order to be able to continue to install the blade 3 on the arm 1, the operator needs to free the hydraulic connector 30 from the end part 2, to which it is still connected by the second retractable button 5. He therefore depresses this second button in order to cause it to move under the base 2c and causes the entirety of the adaptor 20, which slides along the rails 8, to enter the internal volume of the end part 2. When the outer faces of the rails 8 come into abutment against the lips 22 of the adaptor 20, the installation of the new blade is complete, the hydraulic connector 30 being attached to the mechanical connector 10 and free of the end part 2.

During this final translational movement, the finger 39 of the hydraulic connector 30 gradually leaves the rails 8 until it is completely free of them when the end part 2 comes into contact with the cap 11, namely when it reaches its position of use. The hydraulic connector, which is then supported only by the mechanical connector 10, is then free of any interference with the end part 2. The entity formed by the mechanical connector and the hydraulic connector is thus free to rotate with respect to the arm 1, to give the blade 3 the degree of freedom it needs to follow the curvature of the glass that is to be wiped.

Finally, it will be noted that, in an alternative form that has not been depicted, the base 2c of the end part comprises a housing which accepts the second retractable button 5 when the wiper system is in the position of use. Such a structure gives the second flexible tab 35 the possibility of reverting to a position at rest that is aligned with the plane of the block 33. This avoids the second tab suffering any permanent deformation that could detract from the function of the second retractable button 5. This housing may take the form of a hole made through the base 2c or of a deformation, referred to as lining, made in the wall of the base 2c. In both instances, this hole or this deformation has a dimension at least equal to the dimension of the second button and may have a median axis that coincides with a median axis of the second blocking means, notably the recess 7.

The invention claimed is:

1. A wiper system comprising:
   a hydraulic connector;
   an end part of an arm extending in a longitudinal direction;
   a blade;
   a mechanical connector, separately from the hydraulic connector, fixed to said blade for attaching the blade to the arm;
   at least one pipe for conveying a liquid to the blade via the mechanical connector; and
   at least one first retractable button intended to connect the hydraulic connector to the end part of the arm in a standby position,
   wherein said first retractable button is retractable so as to allow movement of the hydraulic connector with respect to the end part of the arm, and
   wherein the first retractable button is configured to:
   block a translational movement between the hydraulic connector and the end part of the arm in the standby position, collaborate with a cutout borne by said end part of the arm to allow attachment of the hydraulic connector to the mechanical connector in a first part of the translational movement thereof,
   said first retractable button being retractable in a direction perpendicular to said translational movement so as to allow the hydraulic connector to be freed from the standby position and move in conjunction with said mechanical connector in a second part of the translational movement into a position of use.

2. The wiper system as claimed in claim 1, wherein the first retractable button is a flexible tab bearing a button at an end and extending along one face of said hydraulic connector, said face being oriented in said longitudinal direction.

3. The wiper system as claimed in claim 1, wherein the at least one pipe is connected by a block having at least one external surface with generatrices directed parallel to the direction of said translational movement and which surface is intended to collaborate with a base of the end part of the arm.

4. The wiper system as claimed in claim 3, wherein said external surface is planar.

5. The wiper system as claimed in claim 3, further comprising a finger extending longitudinally and able to collaborate with a rail positioned on said end part of the arm, so as to keep the external surface of said hydraulic connector pressed against the base of the end part of the arm.

6. The wiper system as claimed in claim 5, wherein in the finger the rail is borne by said end part of the arm and extending longitudinally.

7. The wiper system as claimed in claim 1, further comprising an edge face able to collaborate with a ridge borne by said end part of the arm to form the end stop for said hydraulic connector with respect to said end part of the arm.

8. The wiper system as claimed in claim 1, further comprising a protrusion able to be forced into a recess borne by the mechanical connector.

9. The wiper system as claimed in claim 8, wherein said protrusion is a cylindrical journal extending laterally with respect to the hydraulic connector.

10. The wiper system as claimed in claim 1, wherein the end part of the arm comprises at least one rail extending in the longitudinal direction and a first end of which forms an end stop for a corresponding end stop positioned on an adaptor in the position of use and the other end of which forms an end stop for an edge face made on the hydraulic connector in the standby position.

11. The wiper system as claimed in claim 10, wherein the rail is extending in the longitudinal direction and on which the hydraulic connector slides.

12. The wiper system as claimed in claim 1, wherein the hydraulic connector comprises an external surface, the end part of the arm comprises a base and a rail extending parallel to the base and distant therefrom by a length such that the rail keeps the external surface pressed against the base during the translational movement between the hydraulic connector and the end part of the arm.

13. The wiper system as claimed in claim 10, wherein the adaptor comprises a second retractable button for attachment of the second retractable button to the end part of the arm able to collaborate with the cutout in the position of use, said first retractable button being retracted in this position.

* * * * *